Sept. 15, 1959   M. A. JOHNSTON   2,904,671
ILLUMINATED AUTOMOBILE DOOR LOCK
Filed Feb. 7, 1958   2 Sheets-Sheet 1
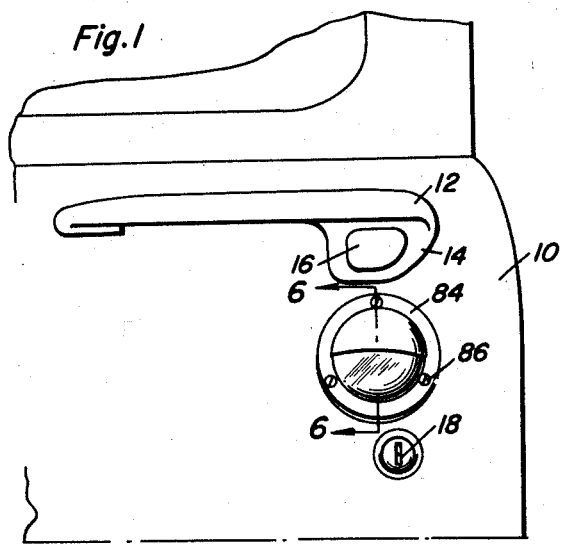
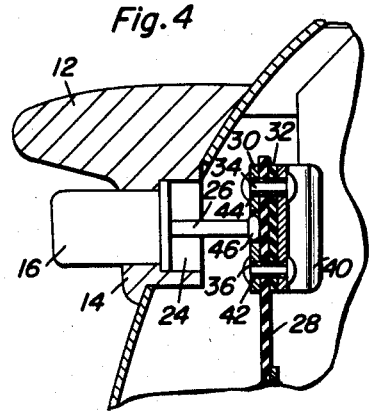
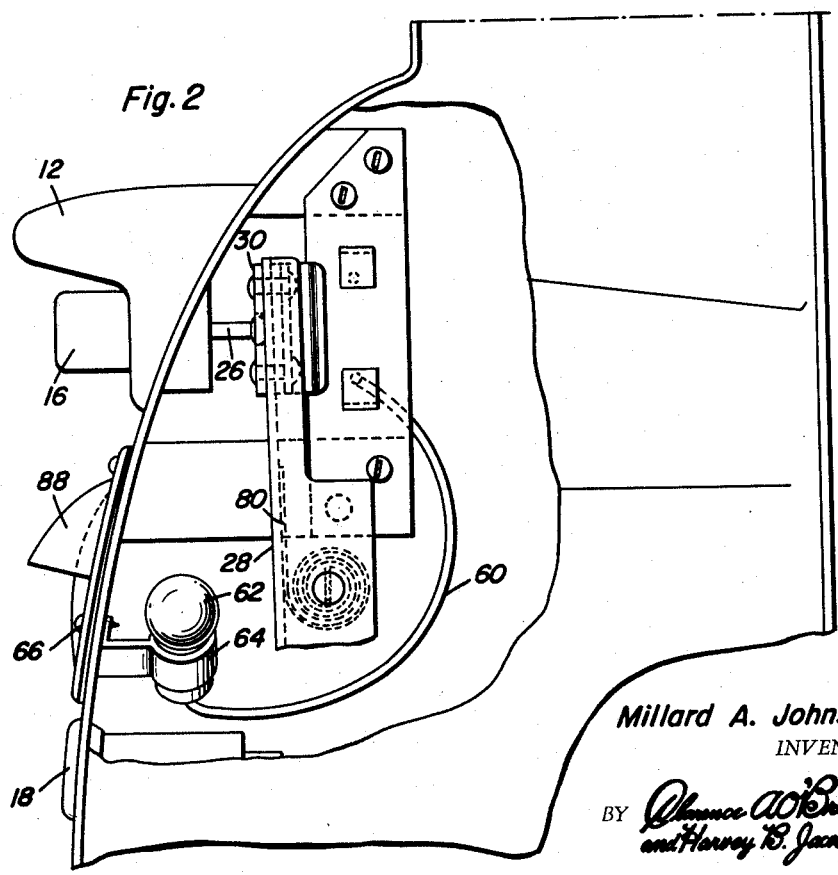
Millard A. Johnston
INVENTOR.

Sept. 15, 1959  M. A. JOHNSTON  2,904,671
ILLUMINATED AUTOMOBILE DOOR LOCK
Filed Feb. 7, 1958  2 Sheets-Sheet 2
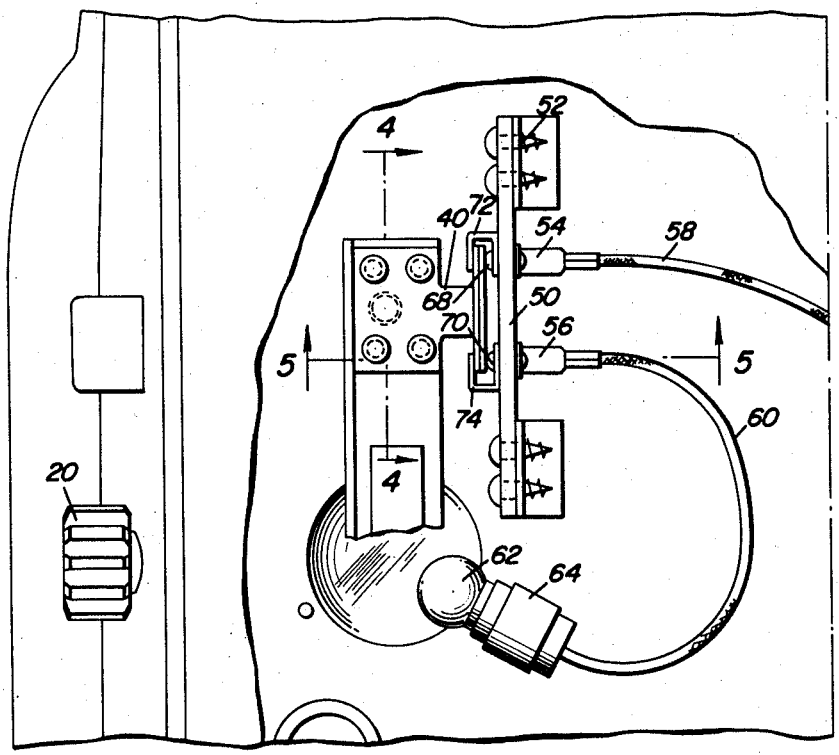
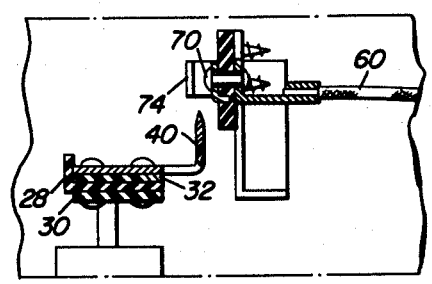
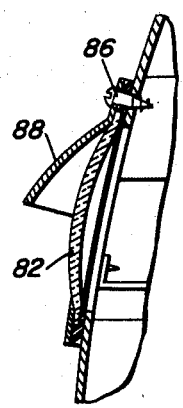
Millard A. Johnston
INVENTOR.

United States Patent Office 2,904,671
Patented Sept. 15, 1959

2,904,671

ILLUMINATED AUTOMOBILE DOOR LOCK

Millard A. Johnston, Fredericktown, Pa., assignor of one-twentieth to John G. Lenco, Washington County, Pa.

Application February 7, 1958, Serial No. 713,840

2 Claims. (Cl. 240—2.13)

This invention relates generally to an illuminated door lock and more particularly to a novel and improved construction for illuminating an automobile door lock.

Most of today's modern automobiles utilize rotary bolt means on the door frame which cooperate with keeper means on the automobile body so as to maintain the door in a closed position. Often, the door handle is rigidly fixed to the automobile door and a push button below the handle is employed to release the rotary bolt so to allow it to rotate and consequently allow the door to be opened. The push button is generally slidably mounted within the handle and has an extending rod which connects with linkages to allow the free rotative movement of the rotary bolt upon depression of the push button. In order to lock the door, means are provided, actuatable by a key, for decoupling the push button from the rotary bolt. That is, upon use of the key, the push button and extending rod would be disconnected from the rotary bolt so as to prevent the opening of the door. Often, at night, automobile operators find it difficult to find the keyhole in the automobile door for insertion of the key and coupling of the push button to the rotary bolt. In order to faciliate the locating of the keyhole, an accessible and easily actuatable illuminating source could be provided adjacent the keyhole. Accordingly, it is a principal object of this invention to provide an accessible and easily actuatable illuminating source for aiding in the location of an automobile door keyhole.

It is a further object of this invention to provide a novel and improved structure to facilitate the mounting of a light source within an automobile frame and to allow for the efficient and convenient electrical connection thereto.

It is a still further object of this invention to provide novel and improved means for actuating the illuminating source by depressing of the push button.

It is a still further object of this invention to provide novel and improved illuminating door lock means which are efficient, reliable, and relatively inexpensive.

In accordance with the above stated objects, below is described a novel and improved construction for illuminating an automobile door keyhole. The invention contemplates the utilization of the extending rod carried by the push button for carrying a bridging bar which electrically bridges a pair of spaced electrical contacts. A first of the electrical contacts is electrically connected to the automobile battery while the second of the contacts is connected to an illuminating source located within the door frame adjacent the automobile door lock. Further an aperture is provided in the door for revealing the illumination of the illuminating source and a hood is optionally provided over the aperture for directing the illumination toward the door lock.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is an elevational front view of a conventional automobile door including the novel illuminating source comprising this invention;

Figure 2 is an elevational side view partially broken away of the automobile door of Figure 1;

Figure 3 is an elevational rear view of the automobile door and illuminating source comprising this invention;

Figure 4 is a sectional view taken substantially along the plane 4—4 of Figure 3;

Figure 5 is a sectional view taken substantially along the plane 5—5 of Figure 3; and Figure 6 is a still further sectional view taken substantially along the plane 6—6 of Figure 1.

With continuing reference to the drawing the numeral 10 represents a conventional automobile door having a fixed handle 12 thereon which has a depending ear 14 slidably accommodating a push button 16 therethrough. Also, a keyhole 18 is provided beneath the handle 12 for enabling the automobile operator to lock the automobile doors by effectively disconnecting the linkage between the push button 16 and a rotary bolt 20 which normally allows for the free rotation of the bolt 20.

The push button 16 is slidable in the hollow 24 and has fixedly connected thereto as an extension thereof a rod 26 which bears against a bracket 28. The bracket 28 is constructed of insulative material and is sandwiched between two Bakelite spacers 30 and 32. A pair of rivets 34 and 36 extend through the spacers 30 and 32 and bracket 28 and support a bridging bar 40 of a conductive material adjacent the outer spacer 32. The rivets 34 and 36 are enclosed in rubber sleeves 42 and 44 thereby electrically isolating the conductive bracket 40. The spacer 30 has an aperture 46 therein which accommodates the push rod 26 so as to direct it against the insulated bracket 28.

A member 50 is affixed to the door frame by screws as at 52 slightly removed from the slidable path of push rod 26. The member 50 supports thereon electrical contacts 54 and 56 which are respectively connected by conductors 58 and 60 to an electrical energy source, the automobile battery, and to a light source 62. The light source 62 is supported in a conductive collar 64 which is electrically grounded to the automobile body by a screw 66. The electrical contacts 54 and 56 are electrically extended through the member 50 to contacts 68 and 70. Each of the contacts 68 and 70 maintain electrically conductive guide members 72 and 74 in the form of channel pieces therearound. The guides 72 and 74 are adapted to slidably receive the bridging bar 40 so as to allow the bar 40 to electrically bridge the contacts 68 and 70 and virtually connect the conductors 58 and 60 thereby directly connecting the electrical energy source to the light source 62. It is assumed that the electrical energy source would be grounded at its opposite terminal so that a completed circuit to the light source 62 will exist when the contacts 68 and 70 are bridged by the bridging bar 40.

The bracket 28 extends downwardly below the spacers 30 and 32 and is in contact with a spring 80 at its lower end. The spring 80 is a coil spring fixed at its center and bears outwardly on the bracket 28 so as to slidably return the bracket 28, push rod 26, and push button 16 outwardly after the depressive force on push button 16 is removed.

In order to utilize the illuminating source 62 of this invention, an aperture is formed in the car door 10 proximate the light source 62. The aperture is covered by a hard translucent material 82 such as plastic and is maintained over the aperture by a frame 84 supported on the door by a plurality of screws 86. The frame may carry a hood 88 thereon so as to direct the illumination from the illuminating source 62 toward the door keyhole 18.

The operation of this device will be apparent. When the automobile operator desires to locate the door keyhole, he need merely depress the push button 16 thereby bridging the contacts 68 and 70 and energizing the illuminating source 62. This will enable him to readily find the door keyhole. The push button will consequently be returned by the spring 80 upon release of the depressive force.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with an automobile door and lock release mechanism utilizing an external push button and internal rod for releasing a rotary bolt, a pair of fixed spaced electrical contacts, a source of electrical energy electrically connected to a first of said pair of spaced electrical contacts, an electrically responsive light source electrically connected to a second of said pair of spaced electrical contacts, said light source mounted within said automobile door frame, an aperture in said door for revealing said light source, and a bridging bar carried by said rod for electrically bridging said spaced electrical contacts, said rod being carried by said push button as an extension thereof, means mounting said push button in said door for sliding movement with respect thereto, whereby said bar may be slidably carried into bridging relationship with respect to said contacts.

2. In combinaton with an automobile door and lock release mechanism utilizing an external push button and internal rod for releasing a rotary bolt, a pair of fixed spaced electrical contacts, a source of electrical energy electrically connected to a first of said pair of spaced electrical contacts, an electrically responsive light source electrically connected to a second of said pair of spaced electrical contacts said light source mounted within said automobile door frame, an aperture in said door for revealing said light source, and a bridging bar carried by said rod, a guideway adjacent said spaced contacts, said guideway receiving said bridging bar for electrically bridging said spaced electrical contacts, said rod being carried by said push button as an extension thereof, means mounting said push button in said door for sliding movement with respect thereto, whereby said bar may be slidably carried into bridging relationship with respect to said contacts, and a hood on said aperture for directing the illumination from said light source.

References Cited in the file of this patent

UNITED STATES PATENTS

| | | |
|---|---|---|
| 1,674,159 | Cruys | June 19, 1928 |
| 2,256,670 | Greenless | Sept. 23, 1941 |
| 2,296,009 | Bader et al. | Sept. 15, 1942 |
| 2,628,304 | Boyd | Feb. 10, 1953 |